United States Patent Office 3,027,759
Patented Apr. 3, 1962

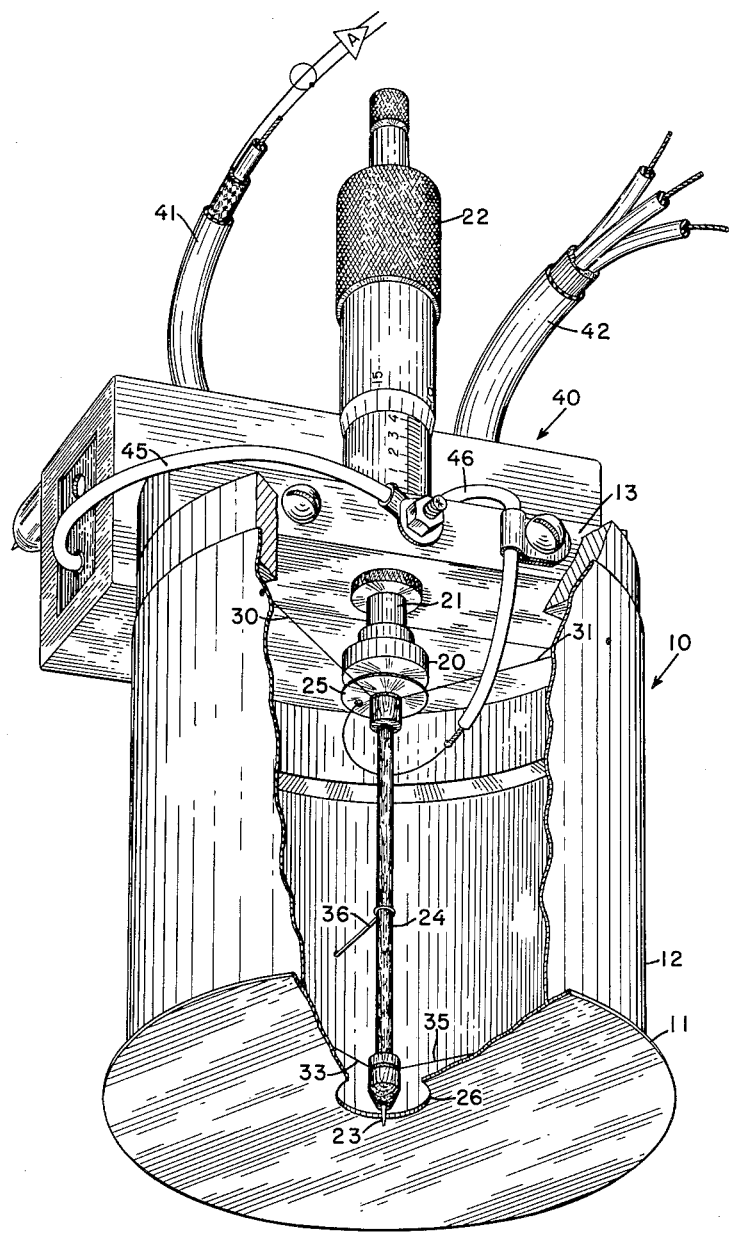

3,027,759
ROUGHNESS GAGE
William L. James 14 Merrill Crest Drive, Madison 5, Wis., and Vance C. Setterholm, 1106 Lakeview Blvd., Middleton, Wis.
Filed Jan. 22, 1959, Ser. No. 788,470
4 Claims. (Cl. 73—105)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the Public.

This invention relates to an instrument for measuring the irregularities, or variations from plane of essentially flat surfaces of sheet materials such as paper stock.

Previous instruments for this purpose include those provided with a probe having a downwardly directed point in contact with the material surface where vertical movement of the probe point relative to the material surface is electrically amplified.

The present improvement is concerned with the manner of mounting the probe in an instrument of this type, and has among its object a simple construction which is readily adjustable to give a very light touch of the probe point on the material surface, with the result that the probe point may be fine and follows faithfully the irregularities without indentation of the material surface, thus to give an accurate record of the surface contour.

For a description of the invention in detail, reference is made to the accompanying drawing in which the single FIGURE is a three dimensional view showing the essential features of the invention with parts broken away to illustrate internal structure.

The frame 10 is provided with a bottom part 11 having a flat underside for slidingly engaging the surface to be tested. The cylindrical wall 12 is fixedly secured to the bottom part and carries the top frame structure 13.

The condenser plate 20 which is stationarily carried by the frame is mounted on the lower end of the movable element 21 of a usual type micrometer 22 mounted on frame structure 13. Such mounting of the stationary condenser plate provides for a precise adjustment of condenser capacitance, the adjustment being useful in calibration of the instrument.

The downwardly directed probe point 23, which may be an ordinary phonograph needle, is mounted on the lower end of an insulating shaft 24, the movable condenser plate 25 being fixed to the upper end of the shaft. The point 23 is substantially coincident with the flat underside of the bottom part, extending through aperture 26 therein.

Flexible, non-stretchable, horizontally extending strands 30 and 31 have their inner ends attached to the probe near its upper end and extend horizontally radially from the probe with a 120° angle between the strands, the outer ends of the strands being attached to the cylindrical wall 12 of the frame. Similar flexible, non-stretchable strands 33 and 35 are attached to the lower end of the probe and the frame and extend generally in the same direction as strands 30 and 31. The several non-stretchable strands permit a slight vertical movement of the probe. A horizontally extending elastic strand 36 under tension, made from a material such as rubber, has its inner end attached to the probe and its outer end attached to the cylindrical wall 12 of the frame and extends radially from the probe at such an angle to the non-stretchable strands that it pulls the probe taut against tension in the non-stretchable strands. The tension in the elastic strand counterbalances the weight of the probe and its carried parts due to its lifting effect, but permits the probe point to fall slightly below the flat underside of the frame when the probe point is free from contact with the material surface. Such mounting of the probe gives a light touch of the probe point to the material surface.

The inner end of the elastic strand is mounted to the shaft 24 with an ordinary loop to permit easy slippage of the mounting vertically on the shaft for adjustment purposes. Movement of the inner end downwardly changes the slope of the elastic strand, increasing its lifting effect on the shaft thus resulting in a lighter touch of the probe point.

The electronic oscillator is designated generally by character 40 and is preferably mounted near the condenser plates. Leads 41 and 42 connect the electronic oscillator to the electronic device (not shown). Lead 45 grounded on metal frame structure 13 connects through the metal parts to condenser plate 20. Flexible lead 46 connects to condenser plate 25.

Movement of the flat underside of the frame relative to the surface of the material being tested causes movement of condenser plate 25 relative to the stationary plate 20 to vary the capacitance of the condenser in accordance with the roughness of the material surface.

We claim:
1. An instrument for measuring irregularities in the flat surface of sheet material, comprising a frame having a flat underside for sliding movement in contact with the material surface, a probe having an insulating shaft and a downwardly directed probe point, a condenser having one of its plates stationarily carried by the frame and its other plate fixed to the insulating shaft, a first pair of flexible, non-stretchable strands having their inner ends attached to the probe near the upper end thereof and extending horizontally radially from the probe at an angle to each other with their outer ends attached to the frame, a second pair of flexible, non-stretchable strands having their inner ends attached to the probe near the lower end thereof and extending horizontally radially from the probe generally in the same direction as that of the first pair of strands with their outer ends attached to the frame, said two pairs of strands permitting slight vertical movement of the probe, and an elastic strand under tension having its inner end attached to the probe and its outer end attached to the frame and extending radially from the probe at such an angle to the non-stretchable strands that it pulls the probe taut against tension in the non-stretchable strands and exerts a lifting effect on the probe to counterbalance its weight but permits the probe point to fall slightly below the flat underside of the frame to give a light touch of the probe point on the material surface, whereby movement of the flat underside of the frame relative to the material surface causes movement of the condenser plate carried by the probe to vary the capacitance of the condenser in accordance with the roughness of the material surface.

2. The instrument of claim 1 wherein the attachment of the elastic strand is adjustable to change the slope of the strand to alter its lifting effect on the probe.

3. An instrument for measuring irregularities in the flat surface of sheet material comprising a frame having a flat underside for sliding movement in contact with the material surface; a probe having an insulating shaft and a downwardly directed probe point; a condenser having one of its plates stationarily carried by the frame and its other plate fixed to the insulating shaft; a first pair of flexible, nonstretchable strands having their inner ends attached to the probe near the upper end thereof and extending horizontally radially from the probe at an angle of about 120° to each other with their outer ends attached to the frame;

a second pair of flexible, nonstretchable strands having their inner ends attached to the probe near the lower end thereof and extending horizontally radially from the probe at an angle of about 120° to each other in the same direction as that of the first pair of strands with their outer ends attached to the frame; and an elastic strand under tension having its inner end attached to the probe and its outer end attached to the frame and extending radially from the probe at such an angle to the nonstretchable strands that it pulls the probe taut against tension in the nonstretchable strands and also exerts a lifting effect on the probe to counterbalance its weight but permits the probe point to fall slightly below the flat underside of the frame to give a light touch of the probe point on the material surface, whereby movement of the flat underside of the frame relative to the material surface causes movement of the condenser plate carried by the probe to vary the capacitance of the condenser in accordance with the roughness of the material surface.

4. The instrument of claim 3 wherein the attachment of the elastic strand is adjustable to change the slope of the strand to alter its lifting effect on the probe.

References Cited in the file of this patent

UNITED STATES PATENTS

| | | |
|---|---|---|
| 1,918,972 | King | July 18, 1933 |
| 2,331,904 | Gustafsson et al. | Oct. 19, 1943 |
| 2,510,822 | Jacot et al. | June 6, 1950 |
| 2,613,536 | Jakosky | Oct. 14, 1952 |